(12) United States Patent
Hiti et al.

(10) Patent No.: US 6,222,335 B1
(45) Date of Patent: Apr. 24, 2001

(54) METHOD OF CONTROLLING A VOLTAGE-FED INDUCTION MACHINE

(75) Inventors: Silva Hiti, Torrance; Constantin C. Stancu, Anaheim, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/492,662

(22) Filed: Jan. 27, 2000

(51) Int. Cl.[7] ........................................... H02P 7/00
(52) U.S. Cl. .................. 318/432; 318/808; 318/798; 318/800; 318/801; 318/727
(58) Field of Search ................... 318/432, 808, 318/798, 800, 801, 727

(56) References Cited

U.S. PATENT DOCUMENTS

| 5,668,721 | 9/1997 | Chandy ........................ 701/41 |
| 5,739,664 | * 4/1998 | Deng et al. .................. 318/808 |
| 5,959,431 | * 9/1999 | Xiang ........................ 318/811 |

* cited by examiner

Primary Examiner—Karen Masih
(74) Attorney, Agent, or Firm—Anthony Luke Simon

(57) ABSTRACT

A control algorithm or method for use in controlling a voltage-fed induction machine. The control algorithm includes the following steps. The DC link voltage supplied to an inverter driving the induction machine is monitored. When the DC link voltage is high enough, the algorithm controls the amount of current supplied to the induction machine to provide current controlled operation of the induction machine. When the DC link voltage is not high enough to control the current under transient conditions, the induction machine is controlled by imposing the maximum possible phase voltage and optimal slip angle on the machine to provide maximal torque per ampere operation of the induction machine. The maximal torque per ampere operation is performed when either of the following conditions is met: a) the torque level required by the induction machine is such that efficiency optimization cannot be performed, or b) current regulators approach saturation. The current controlled operation is performed when a) the torque level required by the induction machine is at a level that allows efficiency optimization, and b) the current regulators are not near saturation. The efficiency optimization in the current controlled mode is performed by using a single constant over the whole operating range.

5 Claims, 1 Drawing Sheet

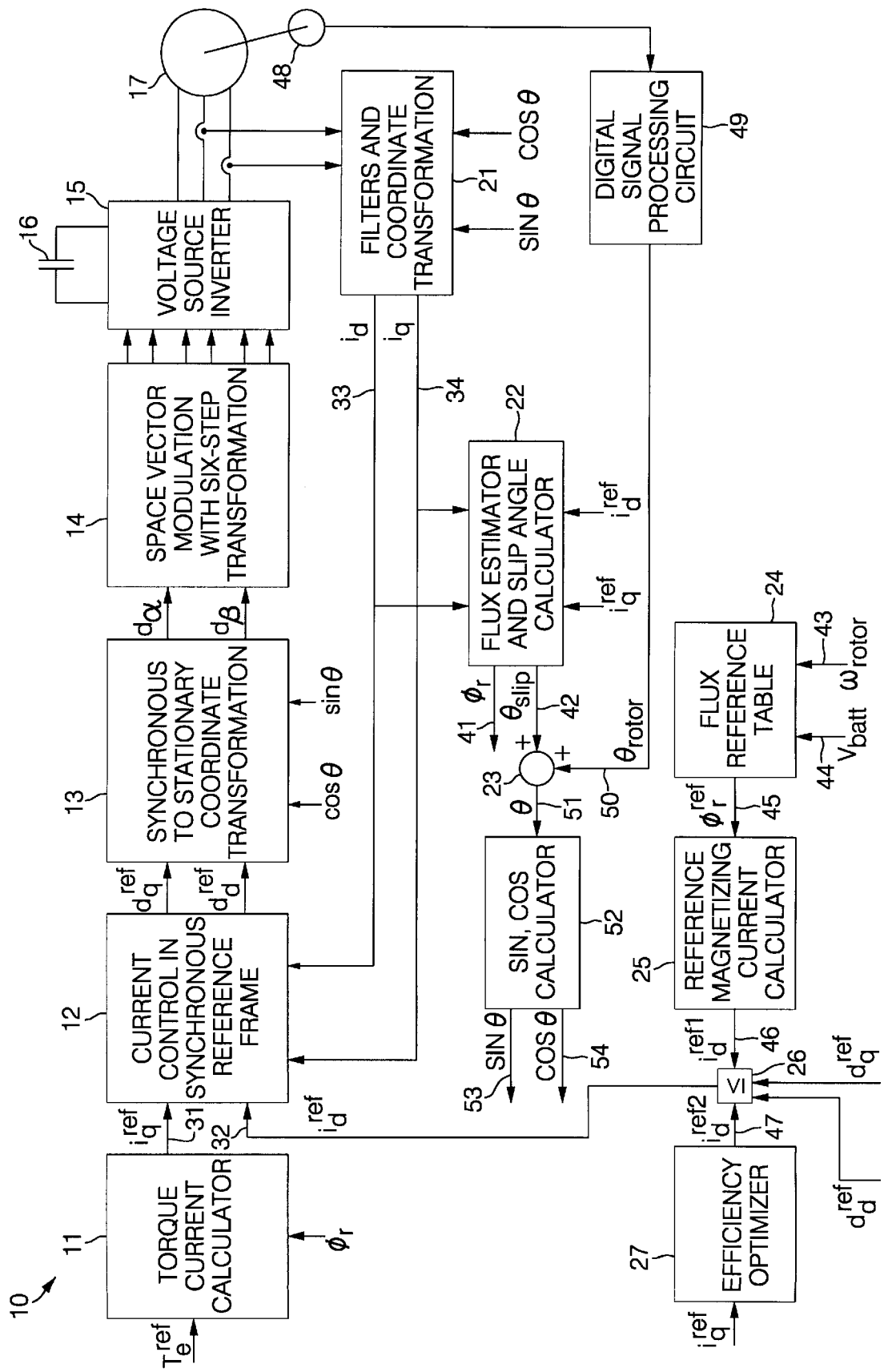

METHOD OF CONTROLLING A VOLTAGE-FED INDUCTION MACHINE

The present invention relates generally to digital control of induction machines fed by a voltage source inverter, and more particularly, to a control method for use in controlling a voltage-fed induction machine that provides maximal efficiency or maximal torque per ampere control of the voltage-fed induction machine.

BACKGROUND

The assignee of the present invention designs and develops voltage-fed induction machine drives comprising motors of electric vehicles. In electric vehicle or a hybrid electric vehicle applications, it is desirable that the drive system, comprising an inverter and an electric motor, operates under maximal efficiency. The drive system should also be capable of producing maximal torque achievable for a given inverter and machine voltage and current rating. This is especially difficult to achieve at lower DC link voltage values.

Example prior slip-control methods are optimized for steady-state operation, and the transient response to torque changes is generally slow, oscillatory, and not always monotonously increasing for a monotonously increasing torque command. Real-time efficiency control algorithms typically require complex signal processing, and typically have poor transient response, since the transient condition has to be identified, and the efficiency optimization algorithm turned off first, before responding to the increasing torque command. Consequently, conventional algorithms do not provide for maximal torque per ampere production at higher torque levels.

It would therefore be desirable to have an improved control algorithm for induction machine control that achieves the highest possible motor efficiency at the operating point. It would also be desirable to have an improved control algorithm for induction machine control that provides good transient response, and tracking of the torque command. It would also be desirable to have an improved control algorithm for induction machine control that provides for maximal efficiency control at low torque levels, and maximal torque per ampere control at high torque levels.

SUMMARY OF THE INVENTION

The present invention comprises an improved control algorithm or method for use in controlling a voltage-fed induction machine that overcomes limitations of conventional approaches. The control algorithm comprises the following steps. The DC voltage supplied to an inverter driving the induction machine is monitored. When the DC link voltage is high enough, the algorithm controls the amount of current supplied to the induction machine to provide current controlled operation of the induction machine. When the DC link voltage is too low to control the motor phase currents under transient conditions, the induction machine is controlled by imposing the maximum possible phase voltage and optimal slip angle on the machine to provide maximal torque per ampere operation of the induction machine.

The current controlled operation is performed when a) the torque level required by the induction machine is at a level that allows efficiency optimization, and b) the current regulators are not near saturation. The maximal torque per ampere operation is performed when either of the following conditions is met: a) the torque level required by the induction machine is such that efficiency optimization cannot be performed, or b) current regulators approach saturation.

BRIEF DESCRIPTION OF THE DRAWINGS

The various features and advantages of the present invention may be more readily understood with reference to the following detailed description taken in conjunction with the accompanying drawing FIGURE which illustrates a control block diagram of an exemplary a control algorithm in accordance with the principles of the present invention for use in controlling a voltage-fed induction machine.

DETAILED DESCRIPTION

Referring to the sole drawing FIGURE, it illustrates a control block diagram of an exemplary a control algorithm 10, or method 10, in accordance with the principles of the present invention for use in controlling an induction machine 17, supplied by a voltage source inverter 15. The control algorithm 10 provides maximal efficiency or maximal torque per ampere control of the induction machine 17. A typical induction machine 17 is a motor used in electric or hybrid electric vehicles, such as those manufactured by the assignee of the present invention, for example.

In electric vehicle or a hybrid electric vehicle applications, it is desirable that the drive system operates under maximal efficiency. The drive system should also be capable of producing maximal torque achievable for a given inverter and machine voltage and current rating. This is especially difficult to achieve at lower DC link voltage values. The control algorithm 10 of the present invention implements induction machine control that provides for maximal efficiency control at low torque levels, and maximal torque per ampere control at high torque levels.

The control algorithm 10 is implemented as follows. The input to the control algorithm 10 is a torque request signal ($T_e^{ref}$) generated by a main vehicle controller. The induction machine 17 is driven by a voltage source inverter 15 that is coupled to a battery 16. The output of the voltage source inverter 15 is coupled to a filter and coordinate transform circuit 21 that processes measured phase currents of the induction machine 17 to produce first and second measured current signals in the synchronously rotating coordinate frame ($i_d$, $i_q$) 33,34.

The output of the relative position sensor 48 is coupled to a digital signal processing circuit 49 that processes the sensor signals to produce the relative rotor position ($\theta_{rotor}$) 50 and the angular speed ($\omega_{rotor}$) 43. The angular speed ($\omega_{rotor}$) 43 of the rotor along with a voltage 44 of the battery 16 are input to a flux reference table 24 which outputs a signal indicative of the desired rotor flux ($\Phi_r^{ref}$) 45 as a function of the two input signals. The desired rotor flux ($\Phi_r^{ref}$) 45 is processed by a reference magnetizing current calculator 25 to produce a first reference for the magnetizing current ($i_d^{ref1}$) in the induction machine 17.

A torque current calculator 11 processes a torque request signal ($T_e^{ref}$) derived from a vehicle controller along with the signal indicative of the rotor flux ($\Phi_r$) 41 to produce a reference for the torque producing current ($i_q^{ref}$) 31 in the induction machine 17.

The torque producing current reference signal ($i_q^{ref}$) 31 is processed by an efficiency optimizer 27 to produce a second reference for the magnetizing current ($i_d^{ref2}$) 47 in the induction machine 17. The first reference for the magnetizing current ($i_d^{ref1}$) 46 is compared in comparator circuitry 26 to the second reference for the magnetizing current ($i_d^{ref2}$) 47. In maximal torque per ampere mode, the output of the comparator circuitry 26, the magnetizing current reference ($i_d^{ref}$) 32 is equal to the first reference for the magnetizing current ($i_d^{ref1}$). In current controlled mode, if the second reference for the magnetizing current ($i_d^{ref2}$) 47 is greater than or equal to the first reference for the magnetizing current ($i_d^{ref1}$) 46, then the magnetizing current reference signal ($i_d^{ref}$) 32 is equal to the first reference for the magnetizing current ($i_d^{ref1}$) 46, otherwise the current reference signal ($i_d^{ref}$) 32 is equal to the second reference for the magnetizing current ($i_d^{ref2}$) 47.

The measured current signals ($i_d$, $i_q$) 33, 34 along with the torque producing current reference signal ($i_q^{ref}$) 31, and the magnetizing current reference signal ($i_d^{ref}$) 32 are processed by a flux estimator and slip angle calculator 22 to produce the estimated rotor flux signal ($\Phi_r$) 41 and the slip angle ($\theta_{slip}$) 42. Slip angle calculator 22 calculates the slip angle ($\theta_{slip}$) 42 that is optimized either for efficiency or maximum torque per ampere operation depending upon the operating conditions. The slip angle ($\theta_{slip}$) 42 and the rotor angle ($\theta_{rotor}$) are added together in the adder 23 to produce the transformation angle ($\theta$) 51, which is the angle between the stationary coordinate frame and the synchronously rotating coordinate frame. Sine and cosine calculator 52 calculates $\sin(\theta)$ 53 and $\cos(\theta)$ 54.

The current reference signals ($i_d^{ref}$, $i_q^{ref}$) 31, 32 and first and second measured current signals ($i_d$, $i_q$) 33, 34 are processed by current regulators 12 that provide current control in a synchronous reference frame. The current regulators 12 output first and second reference duty cycle signals in the synchronously rotating coordinate frame ($d_d^{ref}$, $d_q^{ref}$). The first and second reference duty cycle signals in the synchronously rotating coordinate frame ($d_d^{ref}$, $d_q^{ref}$) along with $\sin\theta$ and $\cos\theta$ signals are processed by a synchronous to stationary coordinate transformation 13 to produce the duty cycle signals in the stationary coordinate frame ($d_\alpha$, $d_\beta$). The duty cycle signals in the stationary coordinate frame ($d_\alpha$, $d_\beta$) are inputs to a space vector modulator 14 whose six outputs drive the voltage source inverter 15.

The induction machine 17 is controlled in two different ways. When the voltage of the battery 16 is high enough, the induction machine 17 is current controlled, and measured current signals ($i_d$, $i_q$) 33, 34 follow the current reference signals ($i_d^{ref}$, $i_q^{ref}$) 31, 32, respectively. When the voltage of the battery 16 is not high enough to control the currents under transient conditions, the induction machine 17 is controlled by imposing the maximum possible phase voltage (for a given battery voltage), and an optimal slip angle 42, so that maximal torque per ampere operation is achieved.

The switchover from the current controlled mode to the maximal torque per ampere mode is performed when either of the following conditions is met: a) the required torque level is too high to perform efficiency optimization 27, or b) the current regulators 12 approach saturation. The transition from the maximal torque per ampere to the current controlled mode happens when conditions a) and b) are false.

The transition between the maximal torque per ampere and current controlled modes is smooth and seamless under all transient conditions. The benefit of operating in current controlled mode is good transient response to step torque change, and easy efficiency optimization, whereas the benefit of operating in the maximal torque per ampere mode is stable operation at high torque levels with maximal torque per ampere production.

In the current controlled mode the flux estimator and slip angle calculator 22 uses the following expressions:

$$\frac{di_{mr}}{dt} = \frac{1}{T_r}(i_d - i_{mr}), \Phi_r = L_r(i_{mr})i_{mr}, \quad (1)$$

$$\omega_{slip} = R_r \frac{i_q}{\Phi_r}, \theta_{slip} = \int \omega_{slip} dt \quad (2)$$

In (1) and (2), $L_r(i_{mr})$ is the rotor inductance, which is a nonlinear function of the rotor magnetizing current, $R_r$ is the rotor resistance value, and $$T_r = \frac{L_r}{R_r}$$

is the rotor time constant.

In the maximal torque per ampere mode, the flux estimator and slip angle calculator 22 uses the following expressions:

$$\frac{di_{mr}}{dt} = \frac{1}{T_r}\left(i_d^{ref} - i_{mr}\right), \Phi_r = L_r(i_{mr})i_{mr}, \quad (3)$$

$$\omega_{slip} = R_r \frac{i_{qref}}{\Phi_r}, \theta_{slip} = \int \omega_{slip} dt \quad (4)$$

The value of the reference rotor flux ($\Phi_r^{ref}$) 45 is determined experimentally and stored in a table 24 as a function of DC link voltage value 44 and rotor speed 43, so that maximal torque per ampere performance is obtained. The first estimate of the magnetizing current ($i_d^{ref1}$) 46 is obtained from the estimated rotor flux ($\Phi_r^{ref}$) 45 using an inverse rotor flux magnetizing curve comprising the magnetizing current estimator 25. The estimated rotor flux ($\Phi_r$) 41 is calculated in the maximal torque per ampere mode from equation (3), using $i_d^{ref}$ 46 as an input. In this way the rotor flux ($\Phi_r$) 41 has the correct initial value when going back into the current controlled mode from the maximal torque per ampere mode, allowing for the smooth transition between the two modes of operation.

The efficiency optimizer 27 uses the following equations:

$$i_d^{ref2} = \beta i_q^{ref}. \quad (5)$$

In equation (5), $\beta$ is a single coefficient that is determined experimentally for the best efficiency in the whole current controlled mode.

The comparator 26 first determines whether the current regulators are close to saturation by calculating:

$$(d^{ref})^2 = (d_d^{ref})^2 + (d_q^{ref})^2. \quad (6)$$

Then comparator 26 compares $d^{ref}$ to $d^{max}$. If $d^{ref} \geq d^{max}$ then the system is in the maximal torque per ampere mode and sets $i_d^{ref} = i_d^{ref1}$, otherwise, if $i_d^{ref2} \geq i_d^{ref1}$, then $i_d^{ref} = i_d^{ref1}$, otherwise $i_d^{ref} = i_d^{ref2}$. The term $d^{max}$ is a design constant.

Several benefits of using the present control algorithm 10 are that efficiency of the induction machine 17 (motor) is improved, and maximal torque per ampere performance is achieved, leading to lower current ratings for the inverter 15 and the induction machine 17. There is a lower DC link voltage requirement, and consequently lower voltage ratings for the inverter 15 and the induction machine 17, due to better utilization of the DC link voltage. Also, improved transient response to step torque changes is provided by using the present control algorithm 10.

As was mentioned previously, look-up tables in a previously developed slip-control method are optimized for steady-state operation, and the transient response to torque changes is generally slow, oscillatory, and not always monotonously increasing for a monotonously increasing torque command. In contrast, the present control algorithm 10 uses a single constant β over the entire speed. DC link voltage, and torque operating ranges to achieve the highest possible motor efficiency at the operating point. In addition, the present control algorithm 10 provides good transient response, and tracking of the torque command.

The present control algorithm 10 has been verified experimentally and has been found to perform well.

Thus, a control algorithm has been disclosed that may be used to control a voltage-fed induction machine that provides maximal efficiency or maximal torque per ampere control of the voltage-fed induction machine. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A control algorithm for use in controlling a voltage-fed induction machine, comprising the steps of:

monitoring the DC link voltage supplied to an inverter driving the induction machine;

when the DC link voltage is high enough, controlling the amount of current supplied to the induction machine to provide current controlled operation of the induction machine; and when the DC link voltage is not high enough to control the current under transient conditions, controlling the induction machine by imposing the maximum possible phase voltage, and an optimal slip angle, to provide maximal torque per ampere operation of the induction machine.

2. The algorithm recited in claim 1 wherein maximal torque per ampere operation is performed when the torque level required by the induction machine is such that efficiency optimization cannot be performed, or current regulators approach saturation.

3. The algorithm recited in claim 2 wherein current controlled operation is performed when the torque level required by the induction machine is at a level that allows efficiency optimization, and the current regulators are not near saturation.

4. Apparatus comprising:

a voltage source inverter coupled to a battery;

an induction machine coupled to the voltage source inverter that receives drive signals therefrom;

a circuit for processing the drive signals to produce first and second measured current signals ($i_d$, $i_q$);

circuitry for obtaining the flux reference produced by the induction machine and for generating a first reference of magnetizing current ($i_d^{ref1}$) produced by the induction machine;

a torque current calculator for processing a torque request signal ($T_e^{ref}$), and a rotor flux signal ($\Phi_r$) to produce a reference for the torque producing current ($i_q^{ref}$);

an efficiency optimizer for processing the reference for the torque producing current ($i_q^{ref}$) to produce a second reference for the magnetizing current ($i_d^{ref2}$) for the induction machine using an experimentally derived constant β to optimize efficiency in the current-controlled mode;

circuitry for comparing the first and second references of the magnetizing current ($i_d^{ref1}$, $i_d^{ref2}$) and outputting a magnetizing current reference signal ($i_d^{ref}$) that is equal to the first reference for the magnetizing current ($i_d^{ref1}$) in the maximal torque per ampere operating mode, and is equal to the second reference for the magnetizing current ($i_d^{ref2}$) if it is greater than or equal to the first reference for the magnetizing current ($i_d^{ref1}$) in the current controlled mode, and outputting magnetizing current reference signal ($i_d^{ref}$) that is equal to the first reference for the magnetizing current ($i_d^{ref1}$) otherwise in the current controlled mode;

current regulators for processing the torque and magnetizing current reference signals ($i_q^{ref}$, $i_d^{ref}$) and the first and second measured current signals ($i_d$, $i_q$) to produce first and second reference duty cycle signals in the synchronously rotating coordinate frame signals ($d_d^{ref}$, $d_q^{ref}$);

synchronous to stationary coordinate transformation circuitry for producing the duty cycle signals in the stationary coordinate frame ($d_{60}$, $d_\beta$); and a space vector modulator whose six outputs drive the voltage source inverter.

5. The apparatus recited in claim 4 further comprising:

a flux estimator and slip angle calculator for processing the measured current signals ($i_d$, $i_q$), the torque current reference signal ($i_q^{ref}$), and the the magnetizing current reference ($i_d^{ref}$), to produce signals indicative of the rotor flux ($\Phi_r$) and the slip angle ($\theta_{slip}$).

* * * * *